(12) United States Patent
Lee

(10) Patent No.: US 8,264,654 B2
(45) Date of Patent: Sep. 11, 2012

(54) LIQUID CRYSTAL DISPLAY AND DISPLAY APPARATUS SET HAVING THE SAME

(75) Inventor: Sang-Duk Lee, Asan-si (KR)

(73) Assignee: Samsung Electronics Co., Ltd. (KR)

( * ) Notice: Subject to any disclaimer, the term of this patent is extended or adjusted under 35 U.S.C. 154(b) by 279 days.

(21) Appl. No.: 12/685,809

(22) Filed: Jan. 12, 2010

(65) Prior Publication Data

US 2010/0208162 A1  Aug. 19, 2010

(30) Foreign Application Priority Data

Feb. 18, 2009  (KR) .................... 10-2009-0013539

(51) Int. Cl.
 *G02F 1/1345* (2006.01)
(52) U.S. Cl. ........................ 349/149; 349/150
(58) Field of Classification Search ........... 349/149–151
See application file for complete search history.

(56) References Cited

U.S. PATENT DOCUMENTS

2003/0043104 A1   3/2003  Lee et al.
2005/0243239 A1*  11/2005  Kondo et al. .................... 349/58
2006/0268194 A1*  11/2006  Morimoto et al. ............... 349/65
2008/0106535 A1*  5/2008   Kim et al. ....................... 345/205
2008/0117376 A1*  5/2008   Takenaka ....................... 349/152

FOREIGN PATENT DOCUMENTS

| JP | 2001194645 A | 7/2001 |
|----|---|---|
| KR | 1020060076591 A | 7/2006 |
| KR | 1020080018721 A | 2/2008 |
| KR | 1020080041089 A | 5/2008 |
| KR | 1020080060442 A | 7/2008 |

OTHER PUBLICATIONS

Extended European Search Report, dated May 4, 2010, during the examination of the corresponding European Patent Application. (No. 10001440.6).

* cited by examiner

*Primary Examiner* — Nathanael R Briggs
(74) *Attorney, Agent, or Firm* — Cantor Colburn LLP

(57) ABSTRACT

A liquid crystal display includes a liquid crystal panel including short sides and long sides, a gate wire extending substantially parallel with the short sides of the liquid crystal panel, a data wire extending substantially parallel with the long sides of the liquid crystal panel and insulated from the gate wire with crossing the gate wire, a first printed circuit board disposed adjacent to a long side of the liquid crystal panel facing a same direction as the liquid crystal panel is and supplying an image signal to the liquid crystal panel, a circuit film electrically connecting the data wire and the first printed circuit board with each other to carry the image signal.

20 Claims, 19 Drawing Sheets

US 8,264,654 B2

LIQUID CRYSTAL DISPLAY AND DISPLAY APPARATUS SET HAVING THE SAME

This application claims priority to Korean Patent Application No. 10-2009-0013539 filed on Feb. 18, 2009 and all the benefits accruing therefrom under 35 U.S.C. §119, the disclosure of which is incorporated herein by reference in its entirety.

BACKGROUND OF THE INVENTION

1. Field of the Invention

The invention relates to a liquid crystal display and a display apparatus set having the same, and more particularly, to a liquid crystal display, which can reduce the manufacturing cost and can be manufactured to have horizontal symmetry in the overall external appearance, and a display apparatus set having the liquid crystal display.

2. Description of the Related Art

Currently, liquid crystal displays ("LCDs") are some of the most widely used flat panel display ("FPD") devices. The LCD is provided with two substrates on which field-generating electrodes are formed, and a liquid crystal layer that is interposed between the substrates. In the LCD, a voltage is applied to the electrodes to rearrange the liquid crystal molecules of the LCD, thereby controlling the quantity of transmitted light.

In a conventional liquid crystal display ("LCD"), the manufacturing cost of a data driver is higher than that of a gate driver, and the data driver requires a relatively high mobility of thin film transistors ("TFTs") constituting the same. Thus, it is difficult to mount the data driver directly on an insulating substrate in the form of integrated circuit chips. In addition, as the number of data lines connected to the data driver increases, the number of data drivers used also increases, which may sharply increase the manufacturing cost. Therefore, in order to reduce the manufacturing cost, it is desired to develop LCDs which can reduce the number of data drivers and/or the number of data lines.

BRIEF SUMMARY OF THE INVENTION

The invention provides a liquid crystal display, which can reduce the manufacturing cost and can be manufactured to have horizontal symmetry in the overall external appearance.

The invention also provides a display apparatus set including the liquid crystal display.

In an exemplary embodiment of the present invention, there is provided a liquid crystal display including a liquid crystal panel including short sides and long sides, a gate wire extending substantially parallel with the short sides of the liquid crystal panel, a data wire extending substantially parallel with the long sides of the liquid crystal panel and insulated from the gate wire with crossing the gate wire, a first printed circuit board disposed adjacent to a long side of the liquid crystal panel facing a same direction as the liquid crystal panel is and supplying an image signal to the liquid crystal panel, and a circuit film electrically connecting the data wire and the first printed circuit board with each other to carry the image signal.

In an another exemplary embodiment of the present invention, there is provided a liquid crystal display including a liquid crystal panel including short sides and long sides, a gate wire extending substantially parallel with the short sides of the liquid crystal panel, a data wire insulated from the gate wire and extending substantially parallel with the long sides of the liquid crystal panel crossing the gate wire, a first printed circuit board disposed adjacent to a long side of the liquid crystal panel facing a same direction as the liquid crystal panel is and supplying an image signal to the liquid crystal panel, a first circuit film electrically connecting the data wire and the first printed circuit board with each other to carry the image signal, a light guide plate disposed below the liquid crystal panel, and a light source supplying light to the light guide plate.

In an exemplary embodiment of the invention, there is provided a display apparatus set including the liquid crystal display, a front case disposed in front of the liquid crystal display and including an open window exposing a display area of the liquid crystal display a back case disposed at a rear of the liquid crystal display and combined with the front case, and a receiving space defined by the inner surfaces of the front and back cases and disposed near by a long side of the open window.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION OF THE INVENTION

Figure 1:
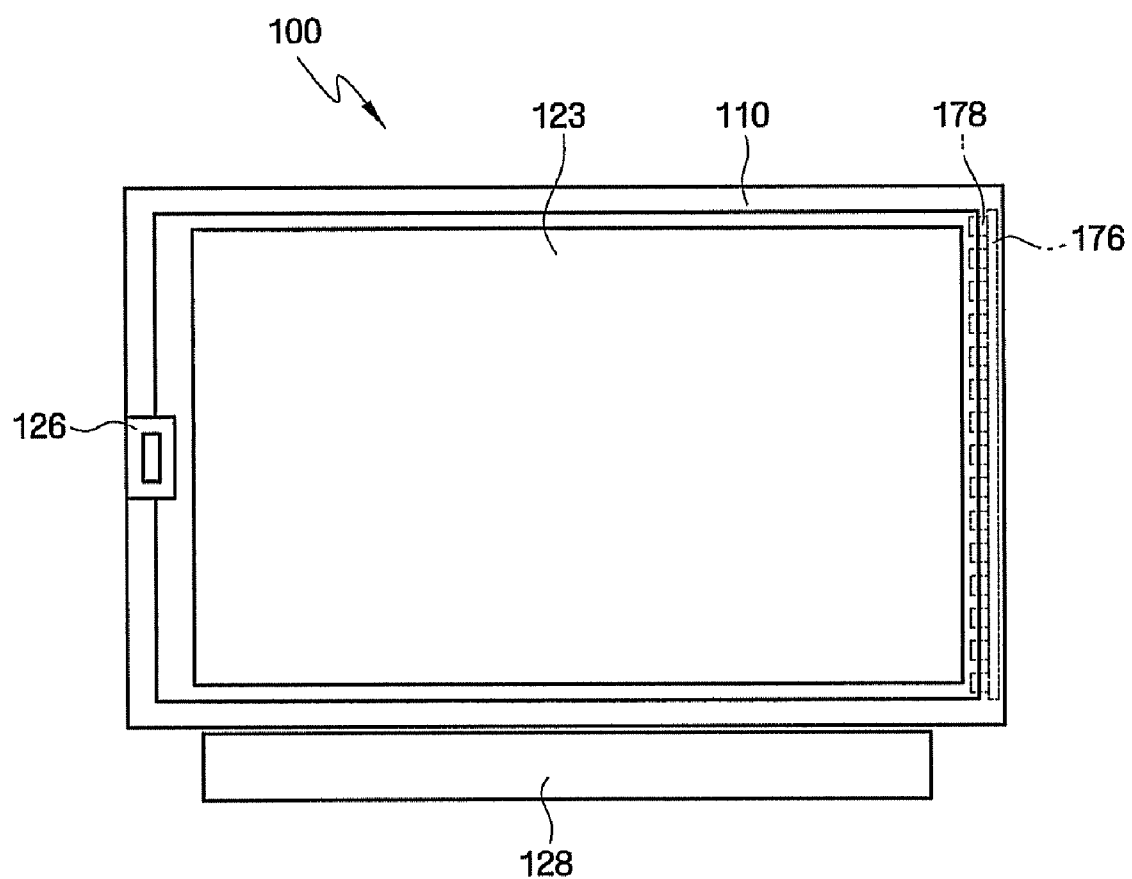
FIG. 1 is a front plan view of an exemplary embodiment of a liquid crystal display ("LCD") according to the invention.

Advantages and features of the invention and methods of accomplishing the same may be understood more readily by reference to the following detailed description of exemplary embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. In the drawings, the size and relative sizes of layers and regions may be exaggerated for clarity.

It will be understood that when an element or layer is referred to as being "on" or "connected to" another element or layer, it can be directly on or directly connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The use of any and all examples, or exemplary language (e.g., "such as"), is intended merely to better illustrate the invention and does not pose a limitation on the scope of the invention unless otherwise claimed.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below", "lower", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "upper" relative to the other elements or features. Thus, the exemplary term "below" can encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the invention are described herein with reference to cross-sectional illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Thus, the regions illustrated in the figures are schematic in nature and their shapes are not intended to illustrate the precise shape of a region and are not intended to limit the scope of the invention.

Hereinafter, exemplary embodiments of the invention will be explained in detail with reference to the accompanying drawings.

A liquid crystal display ("LCD") 100 according to the invention will now be described in detail with reference to FIGS. 1 through 6.

Figure 2A:
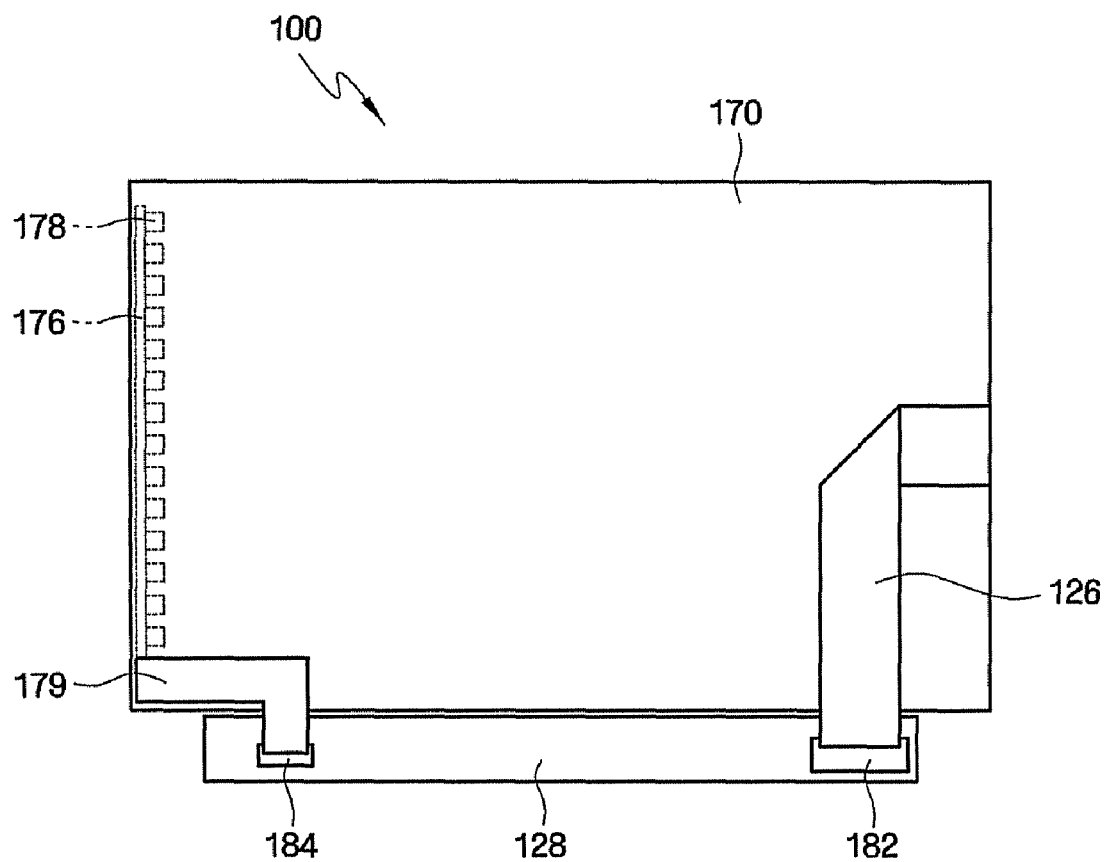
FIG. 2A is a rear plan view of the LCD shown in FIG. 1.
Figure 2B:
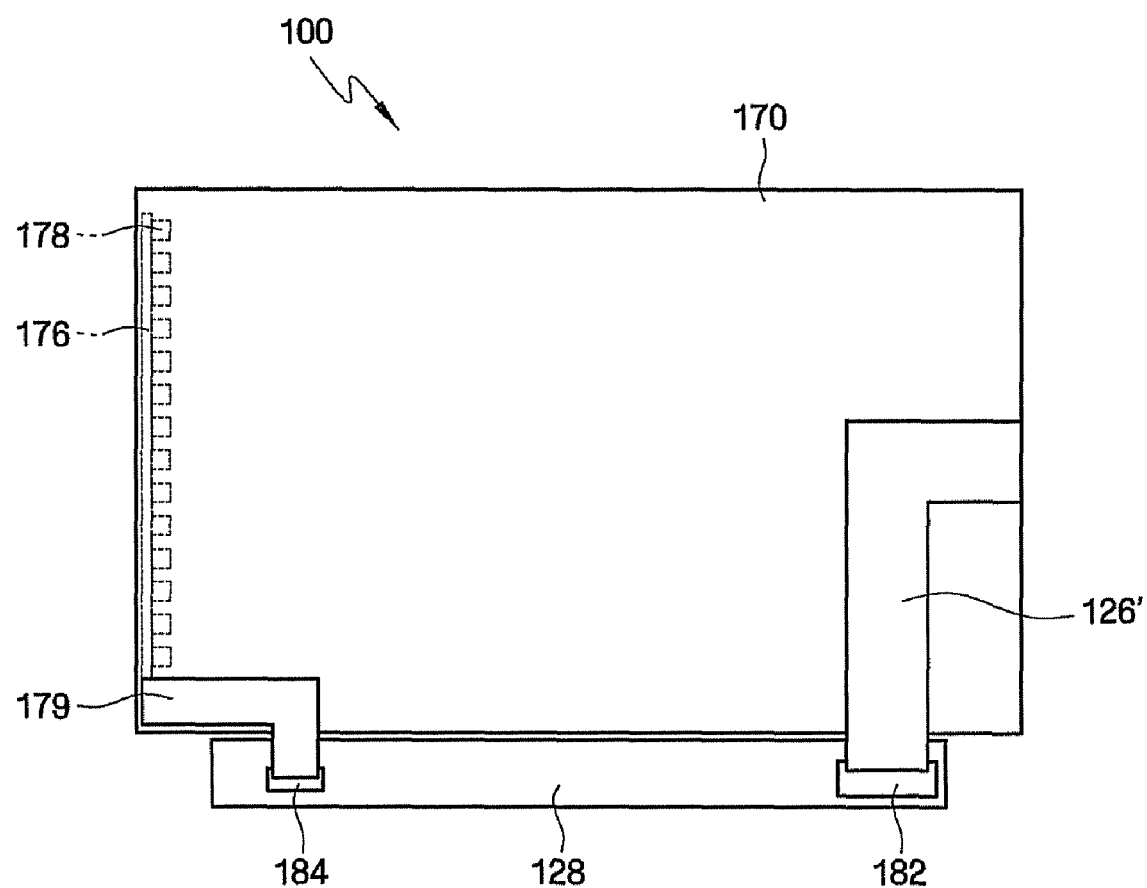
FIG. 2B is a rear plan view illustrating another exemplary embodiment of the LCD shown in FIG. 2A.
Figure 3:
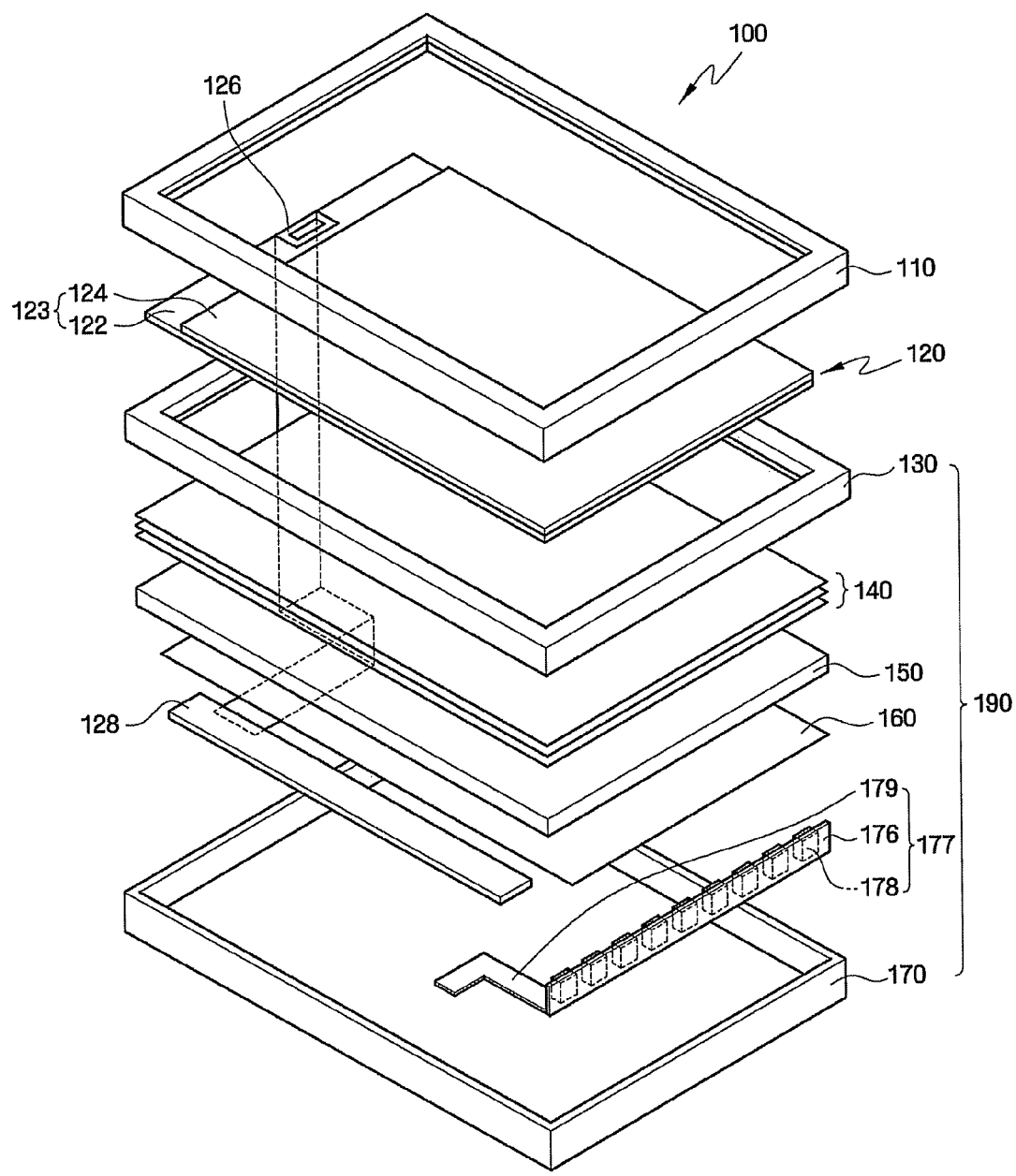
FIG. 3 is an exploded perspective view of the LCD shown in FIG. 1.

FIG. 1 is a front plan view of an exemplary embodiment of a liquid crystal display ("LCD") according to the invention, FIG. 2A is a rear plan view of the LCD shown in FIG. 1, FIG. 2B is a view illustrating another exemplary embodiment of the LCD shown in FIG. 2A, and FIG. 3 is an exploded perspective view of the LCD shown in FIG. 1.

Referring to FIGS. 1 through 3, the exemplary embodiment of the LCD according to the invention generally includes a liquid crystal ("LC") panel assembly 120, a backlight assembly 190 and an upper receiving container 110.

The LC panel assembly 120 includes a liquid crystal panel 123, a chip film package 126 and a first printed circuit board 128.

The liquid crystal panel 123 includes a lower substrate 122, an upper substrate 124 and liquid crystal injected between the lower and upper substrates 122 and 124. The lower substrate 122 includes gate lines, data lines, a thin film transistor ("TFT") array and pixel electrodes. The upper substrate 124 faces the lower substrate 122. The liquid crystal panel 123, which includes shorter sides and longer sides so as to have a generally rectangular shape, displays image information. The longer sides may be referred to as longitudinal sides which extend in a first direction, while the shorter sides may be referred to as transverse sides which extend in a second direction that is inclined with respect to the first direction, such as being substantially perpendicular to each other.

A gate wire may longitudinally extend substantially parallel to short sides of the liquid crystal panel 123, and a data wire may longitudinally extend substantially parallel to long sides of the liquid crystal panel 123. In one exemplary embodiment, the gate wire may longitudinally extend perfectly parallel to short sides of the liquid crystal panel 123, or longitudinally extend in a direction in which the short sides of the liquid crystal panel 123 extend, in a zigzag shape. However, the invention is not limited thereto. In addition, the data wire may longitudinally extend substantially parallel to the long sides of the liquid crystal panel 123, or longitudinally extend in a direction in which the long sides of the liquid crystal panel 123 extend, in a zigzag shape. However, the invention is not limited thereto.

When a viewer watches the LCD 100, such as viewing the LCD 100 in a plan view, the cross section of the liquid crystal panel 123 may be left-right placed and the long sides of the liquid crystal panel 123 may be positioned at upper and lower ends with respect to the watching direction. However, the invention is not limited to the illustrated exemplary embodiment. In alternative embodiments, the cross section of the liquid crystal panel 123 may be left-right placed and the short sides of the liquid crystal panel 123 may be positioned at upper and lower ends with respect to the watching direction.

Referring to FIGS. 1 through 3, the chip film package 126 is positioned at the short side in the left end of the liquid crystal panel 123 as a data driver, and connected to each of a plurality of a data wire disposed on the lower substrate 122, to supply a data driving signal. The chip film package 126 is preferably positioned at the center of the short side in the left end of the liquid crystal panel 123, for facilitating connection with the data wires. The chip film package 126 includes a tape automated bonding ("TAB") tape including interconnection patterns on a base film, and semiconductor chips mounted on the interconnection patterns by a TAB technique. Exemplary embodiments of the chip film package include a tape carrier package ("TCP"), and a chip on film ("COF"). However, the exemplified chip film package is not limited thereto.

In addition, the gate driver is connected to each of the gate wires disposed on the lower substrate 122, to supply a gate driving signal. The gate driver may be formed on the lower substrate 122 in an integrated circuit ("IC") type. In exemplary embodiments, the gate driver may be disposed along the upper or long side at the lower end of the front surface of the lower substrate 122. In an exemplary embodiment of a method of manufacturing an LCD, the gate driver may be formed at the time of manufacturing the TFT array. The gate driver is not limited to the exemplified gate driver and may have the same configuration as the chip film package 126.

In an exemplary embodiment, various driving components (not shown) are mounted on the first printed circuit board ("PCB") 128 to process gate driving signals input to the gate driver, and data driving signals input to the chip film package 126. In other words, the first PCB 128 is combined with the liquid crystal panel 123 to supply image information. In order to achieve connections between the data wires of the liquid crystal panel 123 and the chip film package 126, the chip film package 126 is arranged to be adjacent to the short side of the liquid crystal panel 123. Unlike the chip film package 126, the first PCB 128 combined with the chip film package 126 is arranged to be adjacent to the long side of the liquid crystal panel 123. In such a manner, since the first PCB 128 is arranged at the lower end of the LCD 100 in the plan view, the LCD 100 can be manufactured to have horizontal symmetry in the overall external appearance, thereby providing improved quality of design.

In order to minimize a thickness of the LCD 100 in a third direction substantially orthogonal to the first and second directions described above, the first PCB 128 may be arranged on the same plane as the liquid crystal panel 123. The first PCB 128 is physically and/or electrically connected to an external controller (not shown) through an interface film (not shown), and receives various signals to display images.

Referring to FIG. 2A, a first end of the chip film package 126 is combined with the liquid crystal panel 123, such as using an anisotropic conductive film (not shown), at the front of the LCD 100 (shown in FIG. 1). A second end opposing the first end of the chip film package 126 is combined with the first PCB 128 through the first connector 182, at the rear of the LCD 100. The first connector 182 may be disposed at the rear of the first PCB 128, and may longitudinally extend in a same direction as the first PCB 128.

The chip film package 126, which includes a flexible film, is bent at the short side of the liquid crystal panel 123, and initially horizontally extends on the rear of the LCD 100, to then be folded to extend vertically (e.g., down) towards the first PCB 128 in the plan view of FIG. 2A. The flexible film is a single unitary and indivisible part. As shown in FIG. 3, the chip film package 126 may initially horizontally extend on the rear of the light guide plate 150 to then be folded to extend vertically towards the first PCB 128.

Contact terminals of the first connector 182 are disposed extending towards the liquid crystal panel 123, to facilitate a connection with the chip film package 126. A width of the first PCB 128, taken in the short side direction of the LC panel 123, can be reduced by arranging the first connector 182 in the above-described manner, irrespective of a width of the first connector 182, thereby reducing the overall planar size of the LCD 100. In the alternative exemplary embodiment of the LCD shown in FIG. 2A, as shown in FIG. 2B, a chip film package 126' is generally shaped in an L-shaped form in the plan view.

Referring again to FIG. 1, the backlight assembly 190 includes a mold frame 130, optical sheets 140, a light guide plate 150, a reflective sheet 160, a light source 177, and a lower receiving container 170.

In the illustrated embodiment, the light guide plate 150 guides light supplied from the light source 177 to the liquid crystal panel 123. The light guide plate 150 is formed in a substantially plate shape, and includes a transparent plastic-based material. Exemplary embodiments of the light guide plate 150 include acryl resin, such as polymethyl methacrylate ("PMMA") or polycarbonate. When a light incident into a side surface of the light guide plate 150 reaches a top surface or a bottom surface of the light guide plate 150 at an angle greater than a critical angle of the light guide plate 150, the incident light may be totally reflected at the top or bottom surface of the light guide plate 150 and uniformly transmitted into the light guide plate 150 without being emitted to the outside of the light guide plate 150. Referring to FIG. 3, the top surface of the light guide plate 150 may be a surface directly adjacent to the optical sheets 140 and facing the LC panel assembly 120, where the bottom surface of the light guide plate may be a surface directly adjacent to the reflective sheet 160 and facing the lower receiving container 170.

In an exemplary embodiment, diffusion patterns (not shown) are disposed on at least one surface of the top surface and the bottom surface of the light guide plate 150 to emit the light from the light guide plate 150 to the liquid crystal panel 123 mounted on the light guide plate 150. The diffusion patterns are preferably disposed on the bottom surface of the light guide plate 150. That is to say, the light that is totally reflected from the light guide plate 150 is reflected into the diffusion patterns on the bottom surface of the light guide plate 150, and then emitted to the outside through the top surface of the light guide plate 150.

In order to uniformly maintain brightness of the light emitted to an entire surface of the light guide plate 150, the diffusion patterns disposed on one surface of the light guide plate 150 may vary in their size and/or density according to a distance from the light source 177, and from the light incident surface of the light guide plate 150. In one exemplary embodiment, as the distance from the light source 177 increases, the density or size of the diffusion patterns is increased, thereby maintaining the brightness of the light emitted to the entire surface of the light guide plate 150 at a uniform level. In an exemplary embodiment of a method of manufacturing, the diffusion patterns may be formed by printing ink, such as using a silk-screen printing technique. However, the invention is not limited thereto, and the diffusion patterns having substantially the same operation and effects can be formed by forming fine grooves and/or protrusions on the light guide plate 150.

The light source 177 is disposed facing one side surface of the light guide plate 150. In the illustrated exemplary embodiment, the light source 177 is disposed at the side surface of the light guide plate 150, that is, the short side of the LCD 100, corresponding to the opposite side of the chip film package 126 in the plan view. With this arrangement, in order to allow the light to be uniformly transmitted throughout an entire display screen of the LCD 100, the light guide plate 150 may be substantially flat-shaped to have substantially a same thickness. However, the invention is not limited thereto, and the light guide plate 150 may have various shapes.

In the illustrated embodiment, the light source 177 includes a second PCB 176 including a circuit pattern, a plurality of a point light source element 178 mounted on the second PCB 176, and a second circuit film 179 electrically connecting the second PCB 176 to the first PCB 128. In an exemplary embodiment, the second PCB 176 may be a flexible circuit board.

Each of the point light source elements 178 includes an emitter that generates and directly emits light. Exemplary embodiments of the point light source elements 178 include a light emitted diode ("LED"), an incandescent lamp, a white halogen lamp, and so on. Preferably, an LED having excellent color reproducibility and small power consumption can be used. The point light source element 178 includes a frame (not shown) and red, green and blue light emitting chips mounted within the frame. Red light, green light and blue light emitted from the respective light emitting chips are mixed to then be produced as white light.

Referring to FIG. 3, the second PCB 176 is disposed between an inner sidewall of the lower receiving container 170 and the light guide plate 150 to allow the point light source elements 178 to be mounted therein. A first end of the second circuit film 179 is connected to the second PCB 176 and a second end of the second circuit film 179 opposing the first end, extends to a rear surface of the lower receiving container 170 through an opening (not shown) disposed through the bottom surface of the lower receiving container 170 and is combined with the first PCB 128 on the rear of the first PCB 128 as illustrated in FIG. 2A. The opening is considered a closed opening penetrating the bottom surface of the lower receiving container 170, and the bottom surface of the lower receiving container 170 solely defines the enclosed opening through which the second PCB 176 is disposed.

The second PCB 176 is combined with a second connector 184 disposed on the rear surface of the first PCB 128 through the second circuit film 179. Contact terminals of the second connector 184 may be disposed extending towards the liquid crystal panel 123, like the contact terminals of the first connector 182. That is to say, a portion of the second circuit film 179 longitudinally extends substantially parallel with the short sides of the liquid crystal panel 123 to then be combined with the second connector 184.

Where the second PCB 176 and the second circuit film 179 and the chip film package 126 overlap each other, signal interference may occur. Thus, the second PCB 176 and the second circuit film 179 and the chip film package 126 are preferably arranged so as not to overlap each other. In the illustrated exemplary embodiment, the chip film package 126 is arranged at the short side in the left end of the plan view of the liquid crystal panel 123, and the light source 177 is arranged at the short side in the right end of the liquid crystal panel 123, which opposes the short side at the left end. However, the invention is not limited thereto, and the second PCB 176 and the second circuit film 179 and the chip film package 126 may not overlap each other even when the chip film package 126 and the light source 177 are arranged at the same short side of the liquid crystal panel 123.

The optical sheets 140 are disposed on the light guide plate 150, on a viewing side of the LCD 100, to diffuse and focus light from the light guide plate 150. In the illustrated embodiment, the optical sheets 140 include a diffusion sheet, a prism sheet, and a protective sheet. The diffusion sheet, which is positioned between the light guide plate 150 and the prism sheet, diffuses the light incident from the light guide plate 150 and reduces or effectively prevents partial concentration of the light. The prism sheet includes a prism having a triangular column shape disposed on an upper surface of the prism sheet. The prism sheet is generally composed of more than one member, such as two sheets, disposed at a predetermined angle with respect to each other to have a certain arrangement. The prism sheet functions to condense the light diffused by the diffusion sheet in a direction perpendicular to the plane of the liquid crystal panel 123. Accordingly, most light beams passing through the prism sheet travel vertically, thereby providing a uniform brightness distribution. The protective sheet disposed on the prism sheet protects a surface of the prism sheet, and diffuses the light to provide uniform distribution of light. However, the arrangement of the optical sheets 140 is not limited to the above-described exemplary embodiment, and may change in various manners according to the specification of the LCD 100.

Referring to FIG. 3, the reflective sheet 160 is disposed below the light guide plate 150, towards a rear of the LCD 100, and reflects the light directed downward from the light guide plate 150 and supplies the reflected light upward toward the viewing side of the LCD 100. The reflective sheet 160 reflects the light that is not reflected by the diffusion patterns disposed on one plane of the light guide plate 150 back to an exit surface of the light guide plate 150, thereby reducing loss of the light incident into the liquid crystal panel 123 and improving the uniformity of the light incident into the exit surface of the light guide plate 150. In one exemplary embodiment, the reflective sheet 160 may include polyethylene terephthalate ("PET"), and/or one surface of the reflective sheet 160 may be coated with a diffusion layer including, e.g., titanium dioxide. In an exemplary embodiment of a method of manufacturing, when the coated titanium dioxide is dried and fixed, titanium dioxide may form a white frosted surface, thereby more uniformly diffusing the light and providing a reflecting effect. The reflective sheet 160 is a single unitary and indivisible part.

The mold frame 130 has a rectangular frame shape, and is arranged to be disposed adjacent to an upper periphery of the optical sheets 140. The mold frame 130 is combined with the lower receiving container 170 and accommodates the optical sheets 140, the light guide plate 150, the reflective sheet 160, and the light source 177. The mold frame 130 and the lower receiving container 170 are combined with each other using various manners using hooks or screws.

The liquid crystal panel 123 is disposed on the mold frame 130, and the upper receiving container 110 is disposed adjacent to an upper periphery of the liquid crystal panel 123 to be combined with the lower receiving container 170 and/or the mold frame 130.

Figure 4A:
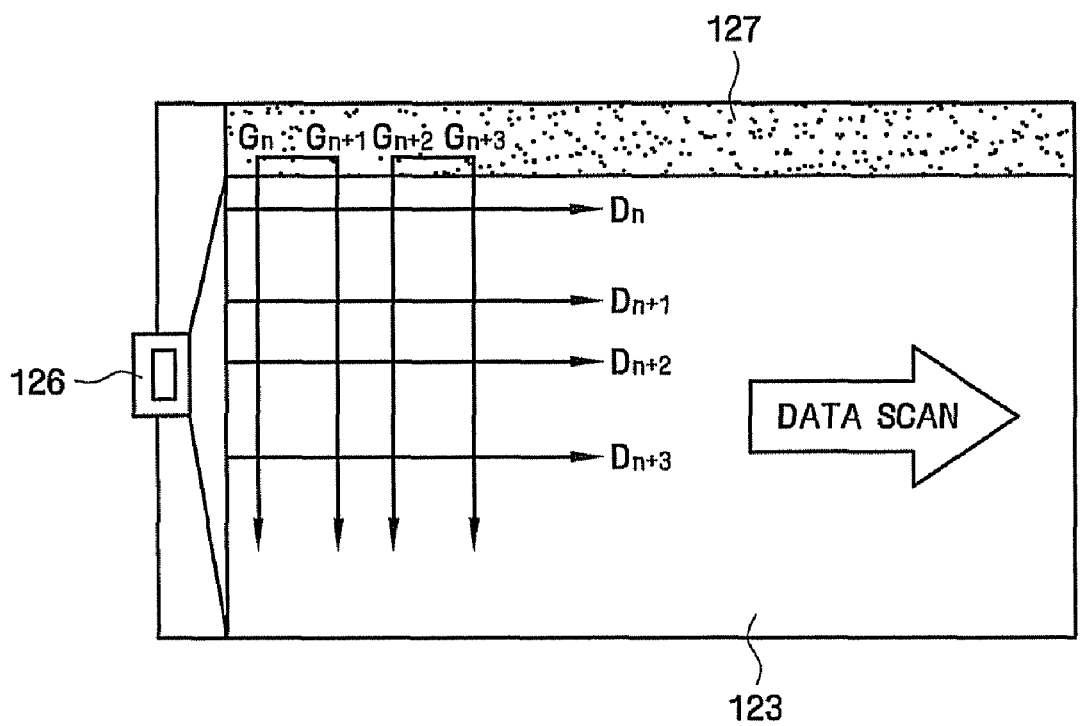
FIG. 4A is a schematic plan view of an exemplary embodiment of a liquid crystal panel shown in FIG. 3.

Hereinafter, a liquid crystal panel shown in FIG. 3 will be described with reference to FIGS. 4A through 4C. FIG. 4A is a schematic plan view of an exemplary embodiment of a liquid crystal panel shown in FIG. 3, FIG. 4B is a plan view of an exemplary embodiment of a pixel array of the liquid crystal panel shown in FIG. 4A, and FIG. 4C is an equivalent circuit view of the pixel array shown in FIG. 4B.

Figure 4B:
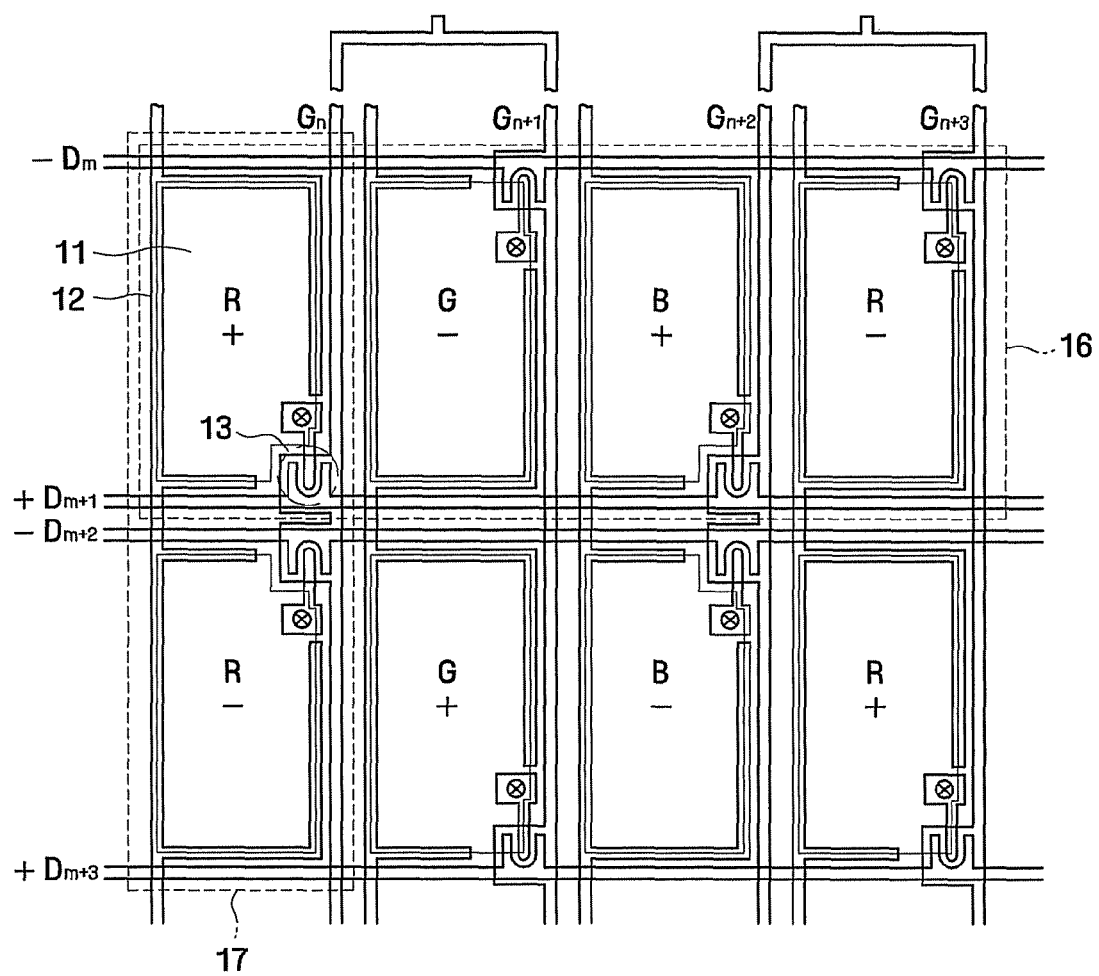
FIG. 4B is a plan view of an exemplary embodiment of a pixel array of the liquid crystal panel shown in FIG. 4A.
Figure 4C:
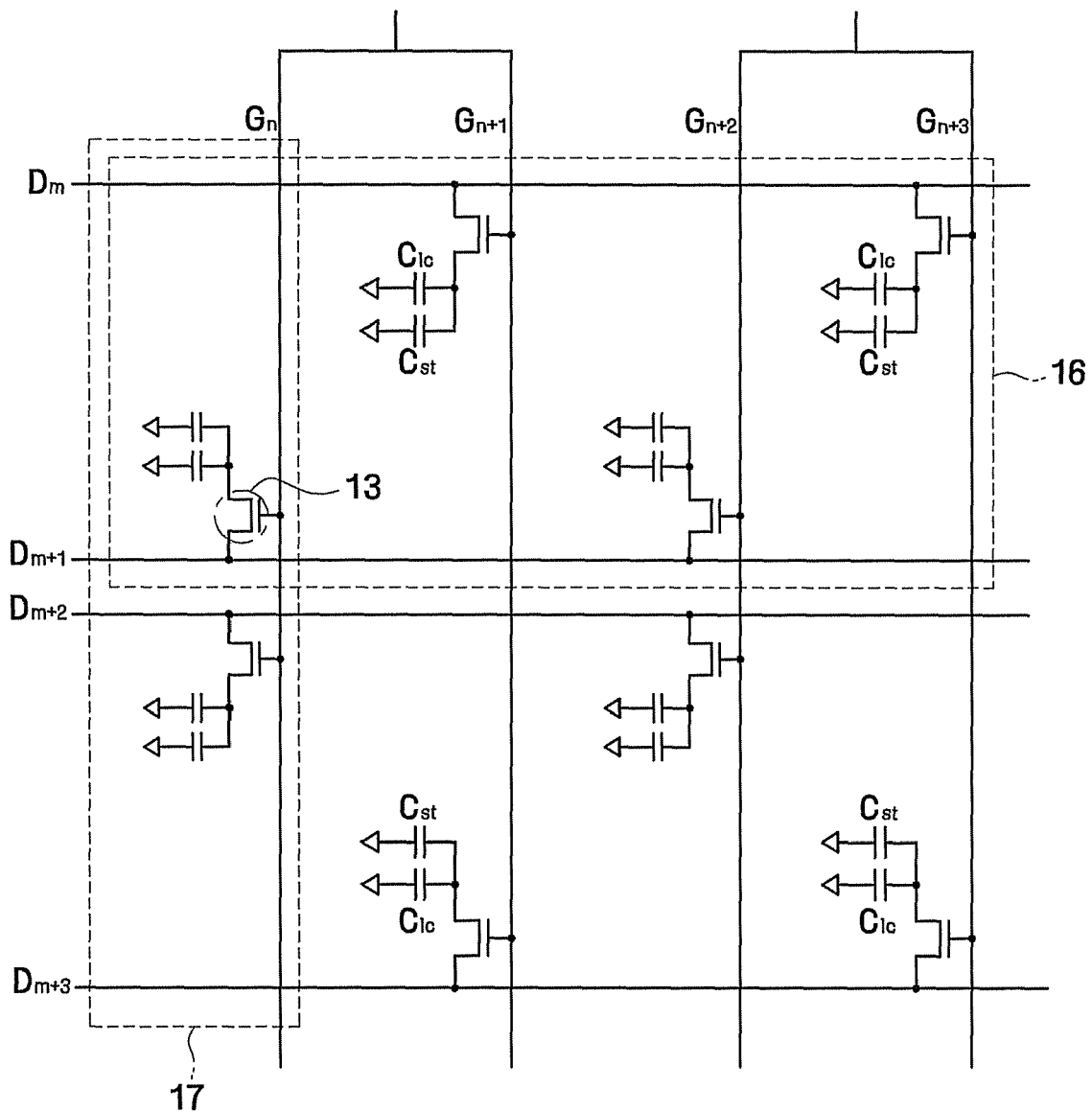
FIG. 4C is an equivalent circuit view of the pixel array shown in FIG. 4B.

Referring to FIGS. 4A through 4C, the liquid crystal panel includes gate wires $Gn$–$Gn+3$, data wires $Dm$–$Dm+3$, a pixel electrode 11, a storage electrode 12, a thin film transistor ("TFT") 13, a chip film package 126 (e.g., a data driver) and a gate driver 127.

In the illustrated embodiment, the data wires Dm–Dm+3 include longitudinally disposed horizontal wires extending substantially parallel with long sides of the liquid crystal panel 123. Accordingly, compared to the conventional pixel array configuration in which longitudinally disposed vertical data wires are used, the number of channels of the data driver 126 can be reduced to two thirds (⅔), and the gate driver 127 is disposed on an insulating substrate in an IC type at the time of manufacturing of a TFT array, thereby manufacturing the liquid crystal panel 123 without using a gate driver IC. The gate driver 127 may be formed in amorphous silicon gate ("ASG") type. Control signals input to the gate driver 127 may be transmitted from the first printed circuit board 128 to the short side of the liquid crystal panel 123 through the chip film package 126 and then be transmitted from the short side of the liquid crystal panel 123 to the gate driver 127 disposed on the long side of the liquid crystal panel 123 through wire patterns formed along edges of the liquid crystal panel 123.

Referring to FIGS. 4B and 4C, two data wires Dm and Dm+1 are disposed at one horizontal pixel row 16, and one gate wire Gn is disposed at one vertical pixel column 17. Of the gate wires Gn–Gn+3, pairs of two adjacent gate wires Gn–Gn+3 are electrically connected to each other, and a plurality of the TFT 13 is arranged in a zigzag manner within each horizontal pixel row 16 to connect corresponding data wires Dm–Dm+3 to the pairs of the gate wires Gn–Gn+3. Since gate signals are simultaneously applied to a pair of adjacent pixels 11 disposed in the horizontal pixel row 16, a sufficient pixel charging time can be ensured.

The liquid crystal panel 123 includes a pixel array defined by a plurality of the pixels 11 arranged in a matrix in the plan view of the liquid crystal panel 123, each pixel 11 being longer in a longitudinal direction, which is taken parallel with the short sides of the liquid crystal panel 123, than in a transverse direction which is taken parallel with the long sides of the liquid crystal panel 123. In the illustrated embodiment, the pixel array has a color filter arrangement type in which the same color is represented for a whole of each vertical pixel column 17, and red (R), green (G) and blue (B) colors are repeatedly represented within each horizontal pixel row 16.

In the illustrated embodiment, in order to suppress textures due to distortion of an electric field in the vicinity as the gate signals are applied to the gate wires Gn–Gn+3, the storage electrode 12 is disposed adjacent to the gate wires Gn–Gn+3, as shown in FIG. 4B.

In the exemplary embodiment, two data wires Dm and Dm+1 are disposed within one continuous horizontal pixel row 16, and one gate wire Gn is disposed within one continuous vertical pixel column 17. However, the invention is not limited to the above-described exemplary embodiment, and one data wire Dm may be disposed within one continuous horizontal pixel row 16, and one gate wire Gn may disposed within one continuous vertical pixel column 17. Compared to the previously described embodiment, the number of data wires, e.g., the number of channels of the data driver 126, is reduced to a half (½) instead of two-thirds (⅔), thereby further reducing the manufacturing cost and increasing the aperture.

Figure 5A:
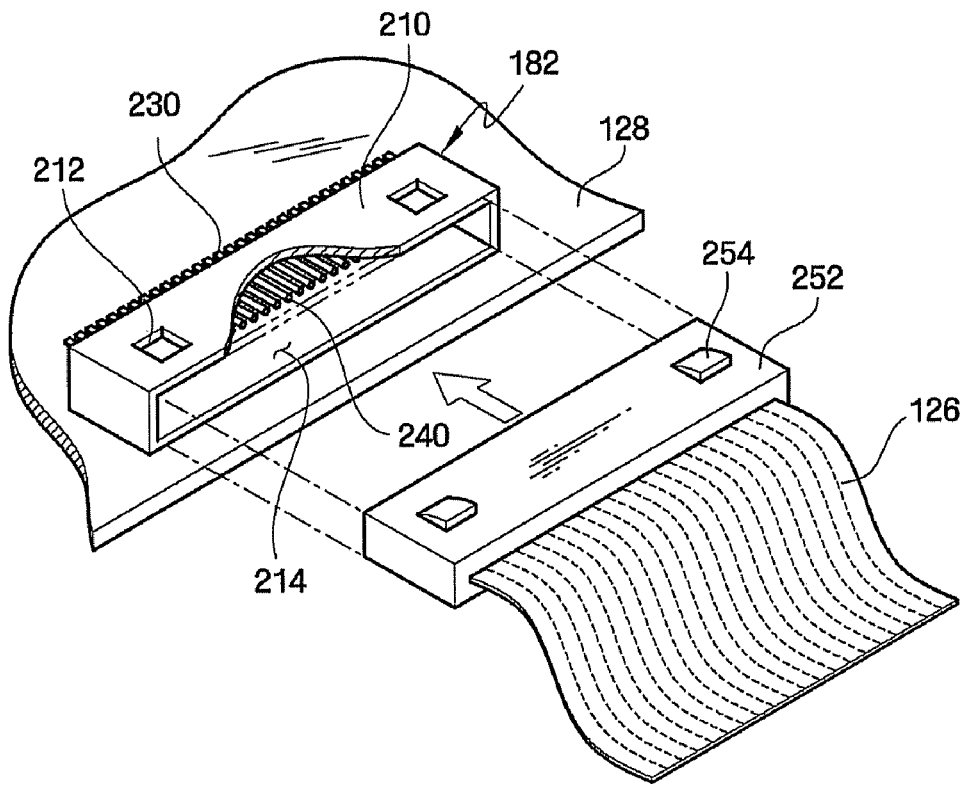
FIG. 5A is a perspective view illustrating an exemplary embodiment of a combination of a first printed circuit board and a chip film package shown in FIG. 1.

Hereinafter, a combination between a first printed circuit board and a chip film package shown in FIG. 1 will be described in detail with reference to FIGS. 5A and 5B. FIG. 5A is a perspective view illustrating a combination between a first printed circuit board and a chip film package shown in FIG. 1, and FIG. 5B is a perspective view of the chip film package shown in FIG. 5A.

Figure 5B:
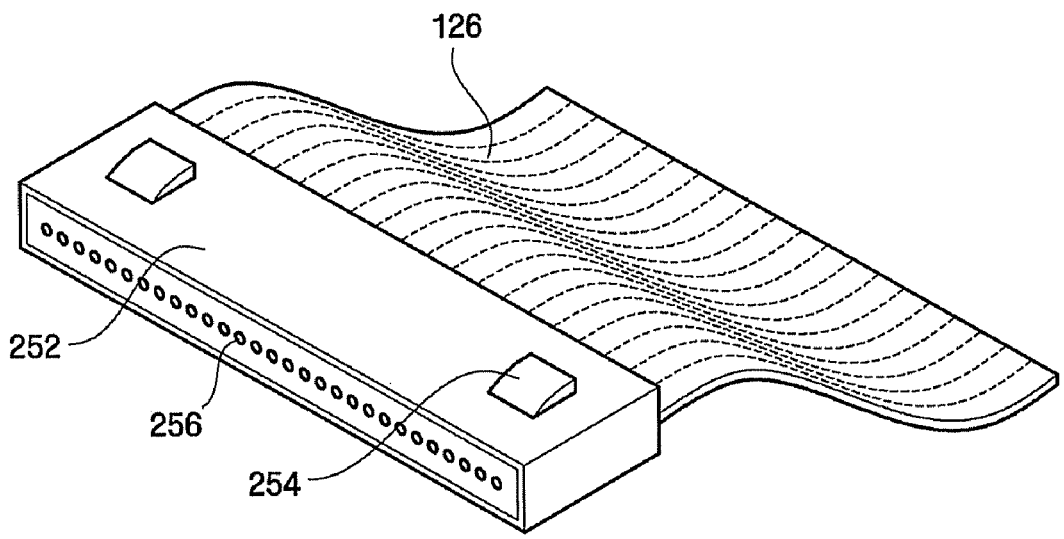
FIG. 5B is a perspective view of the chip film package shown in FIG. 5A.

Referring to FIGS. 5A and 5B, the first connector 182 includes a housing 210 including an insulating material, a plurality of a lead wire 230 disposed at a first side of the housing 210, and a slot 214 disposed at a second side of the housing 210 opposing the first side.

The plurality of lead wires 230, each of which extends outwardly by a predetermined length, are arranged at the first side of the housing 210. Each of the plurality of lead wires 230 is electrically connected to a printed pattern disposed on the first PCB 128, such as by soldering.

The slot 214 is disposed at the second side of the housing 210 so that a cable holder 252 of the chip film package 126 is inserted into the slot 214. In the illustrated embodiment, a plurality of a pin 240 are arranged within the slot 214. The plurality of lead wires 230 are connected to the plurality of pins 240, such as in a one-to-one correspondence relationship. When the cable holder 252 is inserted into the slot 214, the plurality of pins 240 is respectively inserted into a plurality of a pin receiving member 256 disposed within the cable holder 252 shown in FIG. 5B.

In a state in which the cable holder 252 is engaged with a first connector 182, hook connection is achieved. As illustrated in FIG. 5A, a plurality of a hook hole 212 is disposed in the housing 210.

The chip film package 126 includes a plurality of wires which are insulated and separated from each other. A cable holder 252 including an insulating material is disposed at one end of the chip film package 126. As described above, the cable holder 252 is inserted into the slot 214. The plurality of hook holes 212 is disposed at a laterally extending surface of the cable holder 252, which is not connected to the chip film package 126. The plurality of hook holes 212 is connected to the plurality of wires in a one-to-one correspondence relationship.

In order to achieve hook connection between the cable holder 252 and the housing 210 when the cable holder 252 is inserted into the slot 214, a plurality of a hook 254 corresponding to the plurality of hook holes 212 of the housing 210 is disposed at one surface of the cable holder 252 facing the lateral surface of the cable holder 252. In an alternative embodiment, arrangements of the hooks 254 and the hook holes 212 may be reversed. In the illustrated exemplary embodiment, the invention has been described with regard to hook connection between the cable holder 252 and the housing 210. However, the invention is not limited to the illustrated embodiment, and various types of connecting means may be employed.

In the illustrated exemplary embodiment, the invention has been described where the first PCB 128 is combined with the chip film package 126 by the first connector 182. However, the invention is not limited to the illustrated embodiment and the first PCB 128 and the chip film package 126 may be combined with each other through thermal compression using an anisotropic conductive film.

In addition, the second circuit film 179 electrically connected to the second PCB 176 of the light source 177 may be electrically connected to the first PCB 128 by the second connector 184 in substantially the same manner as the connection between the first PCB 128 and the chip film package 126. However, the invention is not limited to the illustrated embodiment, and the second PCB 176 or the second circuit film 179 of the light source 177 and the first PCB 128 may be connected to each other through thermal compression using an anisotropic conductive film.

Figure 6:
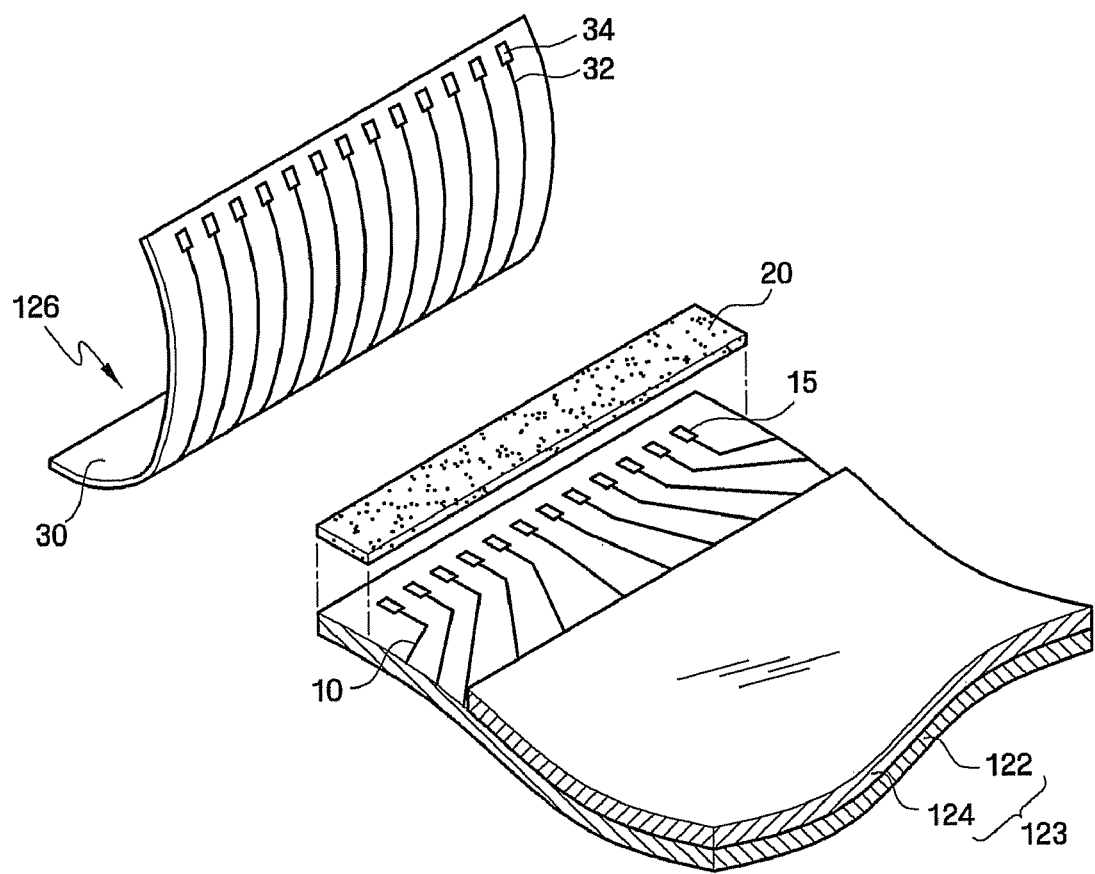
FIG. 6 is a perspective view illustrating an exemplary embodiment of a combination of the chip film package and the liquid crystal panel shown in FIG. 1.

Hereinafter, a combination between the chip film package 126 and the liquid crystal panel 123 shown in FIG. 1 will be described in detail with reference to FIG. 6. FIG. 6 is a perspective view illustrating an exemplary embodiment of a combination between the chip film package 126 and the liquid crystal panel 123 shown in FIG. 1.

Referring to FIG. 6, a plurality of a data wire 10 is disposed on the lower substrate 122 of the liquid crystal panel 123, and a data pad 15 is disposed at a terminal portion of each of the data wires 10. The chip film package 126 includes a flexible circuit film 30, a plurality of a wire pattern 32 disposed on the circuit film 30, and a wire pad 34 disposed at a terminal portion of each of the wire patterns 32. A anisotropic conductive film 20 is adhered to the data pads 15, and the chip film package 126 is arranged on the anisotropic conductive film 20. The data pads 15 and the wire pads 34 are aligned, and the chip film package 126 is combined with the lower substrate 122 of the liquid crystal panel 123, such as through thermal compression.

In the illustrated exemplary embodiment, the anisotropic conductive film 20 includes conductive particles distributed between resin films. The data pads 15 and the wire pads 34 are electrically connected to each other by the conductive particles interposed therebetween, such as by thermal compression. The chip film package 126 is combined with the liquid crystal panel 123, such as by a bonding technique using resin films, at areas other than the data pads 15 and the wire pads 34.

Figure 7:
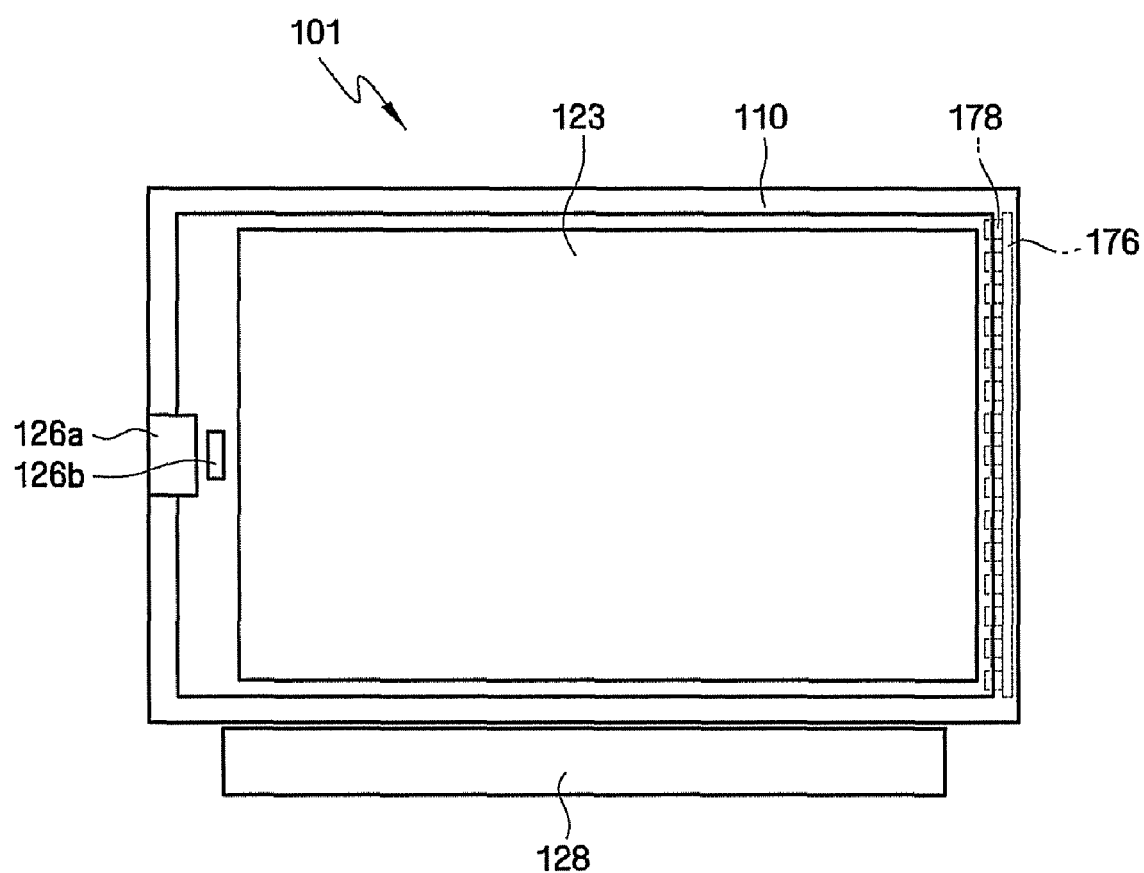
FIG. 7 is a front plan view of an alternative exemplary embodiment of an LCD according to the invention.

Hereinafter, an LCD 101 according to an exemplary embodiment of the invention will be described with reference to FIG. 7. FIG. 7 is a front plan view of an alternative exemplary embodiment of an LCD according to the invention. For convenience of description, components each having the same function for describing the previous exemplary embodiment are respectively identified by the same reference numerals, and the following description will be focused on such differences.

In the LCD 101 shown in FIG. 7, a chip on glass ("COG") chip 126b as a data driver is mounted on a liquid crystal panel 123, and the COG chip 126b and a first PCB 128 are electrically connected to each other by a first circuit film 126a positioned at a first short side in the left end of the liquid crystal panel 123. That is to say, a light source 177 (shown in FIG. 3) may be arranged at a second short side facing the first short side of the liquid crystal panel 123 connected to the first circuit film 126a. In the illustrated exemplary embodiment, the invention has been described that the COG chip 126b includes a single chip. However, the invention is not limited to the illustrated embodiment, and multiple COG chips may be used.

In the following exemplary embodiments, the invention will be described with regard to the chip film package 126 as a data driver, and it is to be understood that instead of the chip film package 126, the COG chip 126b and the first circuit film 126a can be used.

Figure 8A:
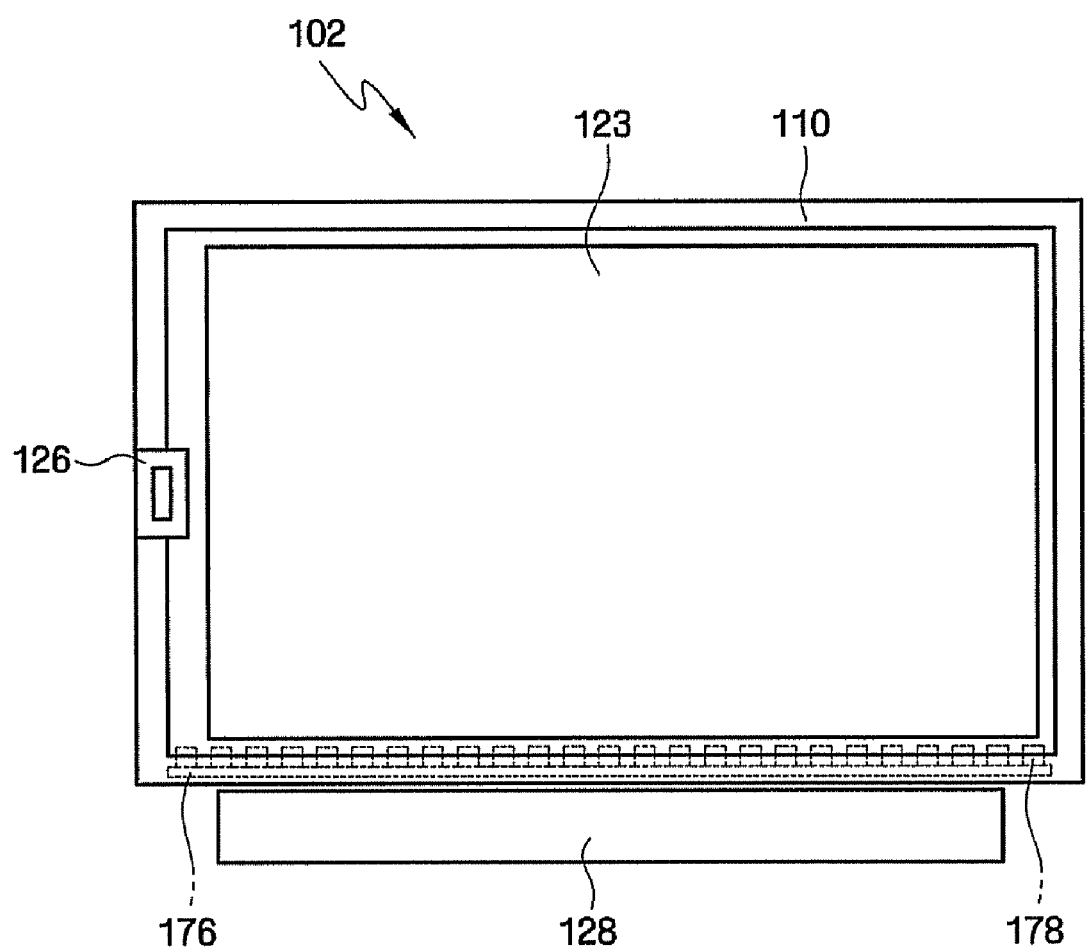
FIG. 8A is a front plan view of an alternative exemplary embodiment of an LCD according to the invention.
Figure 8B:
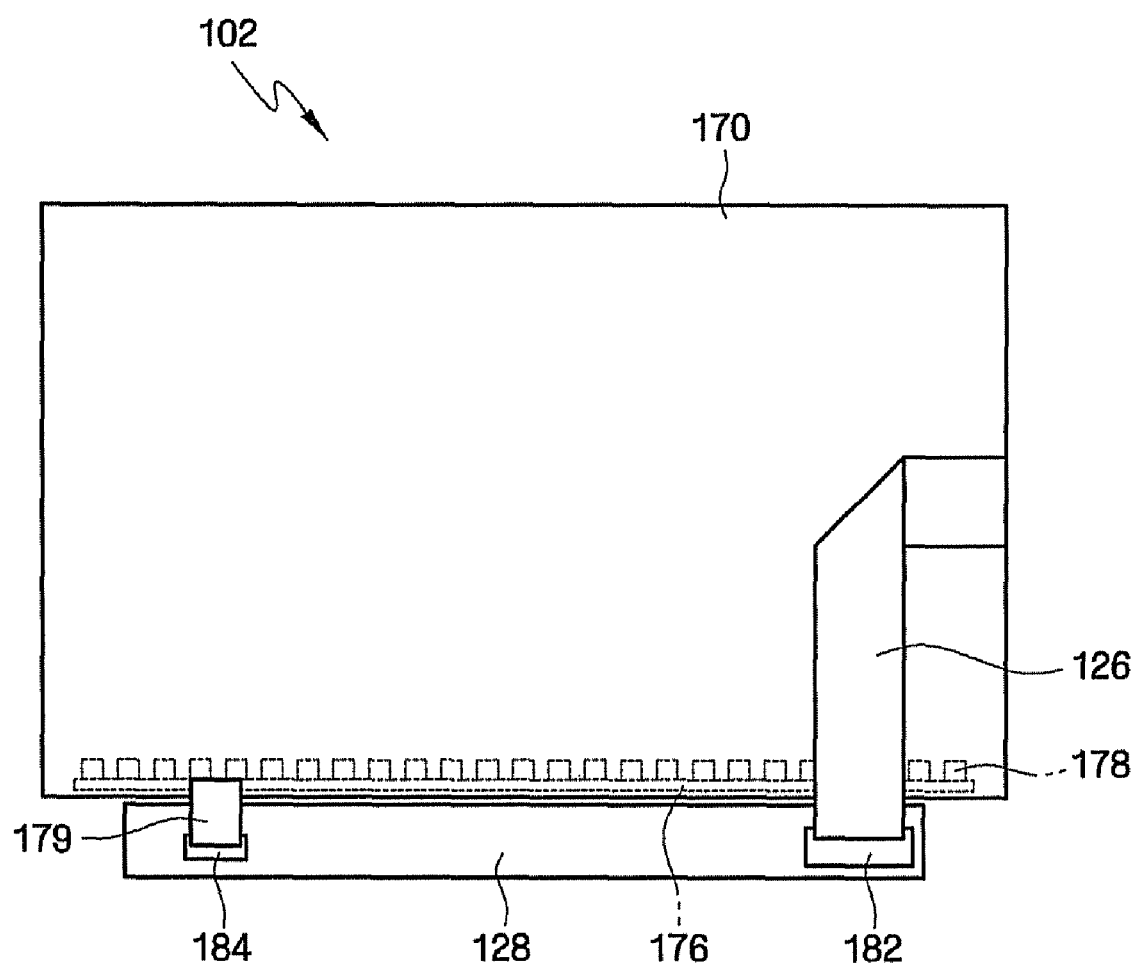
FIG. 8B is a rear plan view of the LCD shown in FIG. 8A.

Hereinafter, an LCD 102 according to an exemplary embodiment of the invention will be described in detail with reference to FIGS. 8A and 8B. FIG. 8A is a front plan view of an alternative exemplary embodiment of an LCD according to the invention, and FIG. 8B is a rear plan view of the LCD shown in FIG. 8A. For convenience of description, components each having the same function for describing the previous exemplary embodiments are respectively identified by the same reference numerals, and the following description will be focused on such differences.

The point light source elements 178 constituting a light source 177, and the second PCB 176 are arranged at one side of the light guide plate 150 along the long side at the lower end of the liquid crystal panel 123. In detail, the point light source elements 178 may be arranged at a lower end of the LCD 102, in the plan view. The point light source elements 178 are disposed at a side of the liquid crystal panel 123 which is adjacent to a side where the chip film package 126 is disposed, as shown in FIG. 8A.

The second circuit film 179 extends to the rear surface of the lower receiving container 170 through an opening disposed extending through the bottom surface of the lower receiving container 170, and is connected with the first PCB 128. The second circuit film 179 is combined with the second connector 184 disposed on the rear surface of first PCB 128. Like the contact terminals of the first connector 182, contact terminals of the second connector 184 may be disposed extending towards the liquid crystal panel 123. That is to say, the second circuit film 179 longitudinally extends substantially parallel with the short sides of the liquid crystal panel 123 and is combined with the second connector 184. Where the second PCB 176 and the second circuit film 179 and the chip film package 126 overlap each other, signal interference may occur. Thus, the second PCB 176 and the second circuit film 179 and the chip film package 126 are preferably arranged so as not to overlap each other. In one exemplary embodiment, if the chip film package 126 is combined with one side of the first PCB 128, the second PCB 176 and the second circuit film 179 may be combined with another side of the first PCB 128 opposing the first side.

Figure 9A:
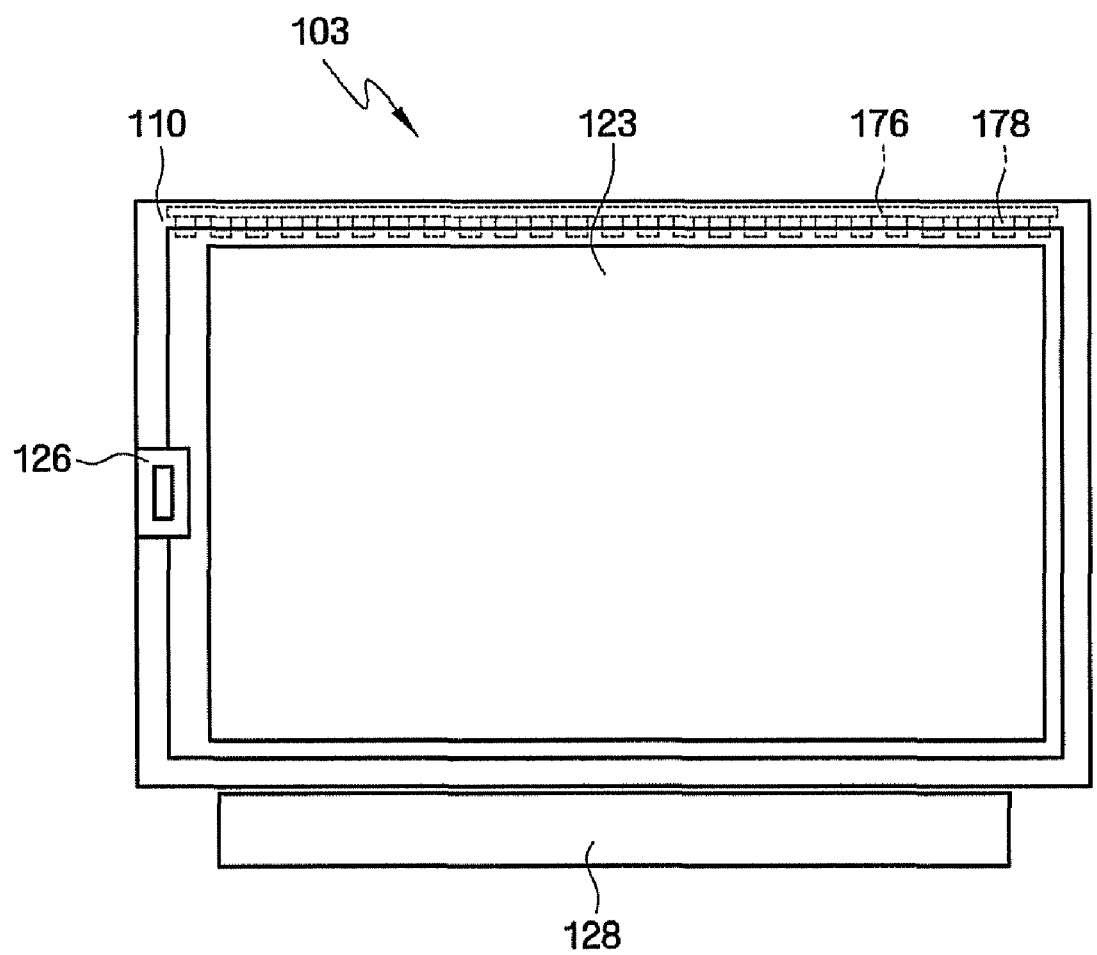
FIG. 9A is a front plan view of an alternative exemplary embodiment of an LCD according to the invention.
Figure 9B:
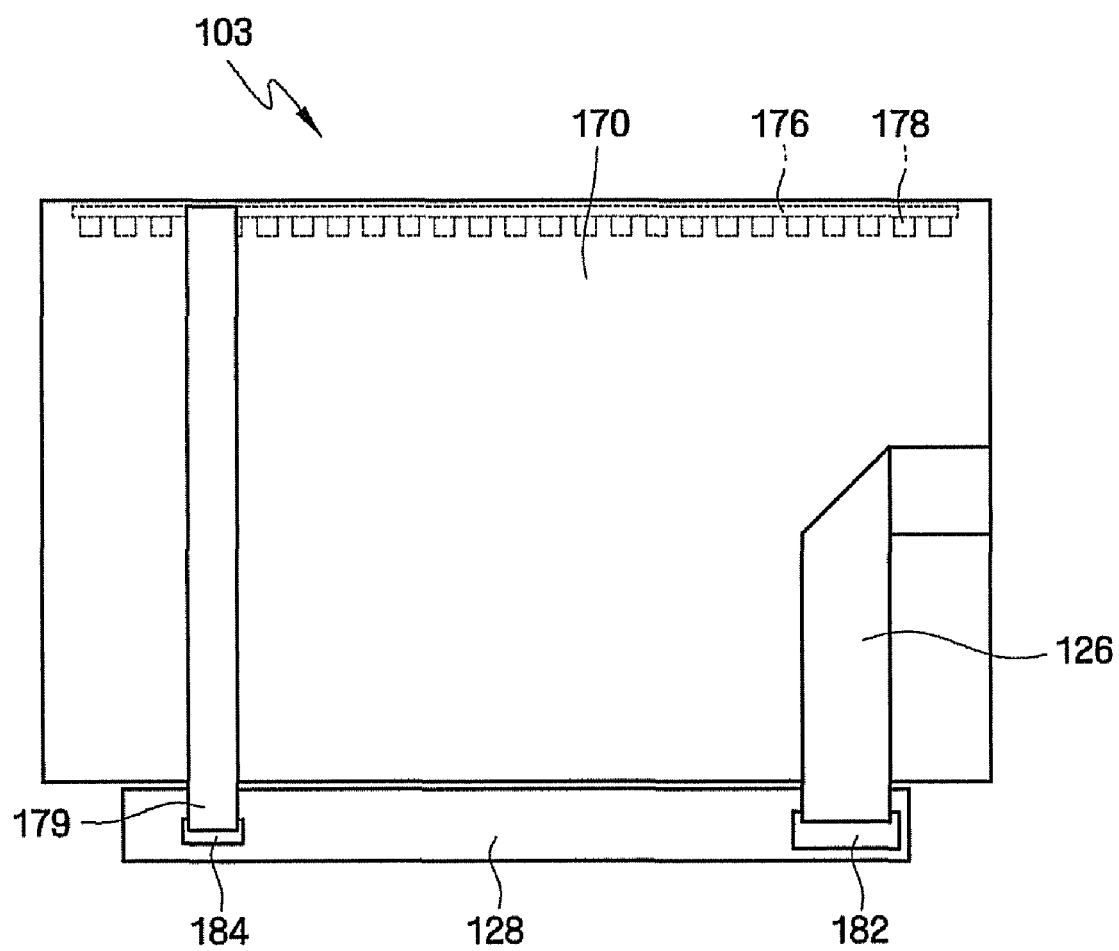
FIG. 9B is a rear plan view of the LCD shown in FIG. 9A.

Hereinafter, an LCD 103 according to an exemplary embodiment of the invention will be described in detail with reference to FIGS. 9A and 9B. FIG. 9A is a front plan view of an alternative exemplary embodiment of an LCD according to the invention, and FIG. 9B is a rear plan view of the LCD shown in FIG. 9A. For convenience of description, components each having the same function for describing the previous exemplary embodiments are respectively identified by the same reference numerals, and the following description will be focused on such differences.

The point light source elements 178 constituting a light source and the second PCB 176 are arranged at one side of the light guide plate 150 along the long side at the upper end of the liquid crystal panel 123. In detail, the point light source elements 178 may be arranged at an upper portion of the LCD 103, in the plan view. The point light source elements 178 are disposed at a side of the liquid crystal panel 123 which is adjacent to a side where the chip film package 126 is disposed, as shown in FIG. 9A.

The second circuit film 179 extends to the rear surface of the lower receiving container 170 through an opening disposed extending through the bottom surface of the lower receiving container 170, crosses the lower receiving container 170 in a longitudinal direction parallel to the short sides of the liquid crystal panel 123, and is connected with the first PCB 128. The second circuit film 179 is combined with the second connector 184 disposed on the rear surface of the first PCB 128. Like the contact terminals of the first connector 182, contact terminals of the second connector 184 may be arranged disposed extending towards the liquid crystal panel 123. That is to say, the second circuit film 179 longitudinally extends substantially parallel with the short sides of the liquid crystal panel 123 and is combined with the second connector 184. Where the second PCB 176 and the second circuit film 179 and the chip film package 126 overlap each other, signal interference may occur. Thus, the second PCB 176 and the second circuit film 179 and the chip film package 126 are preferably arranged so as not to overlap each other. In one exemplary embodiment, if the chip film package 126 is combined with one side of the first PCB 128, the second PCB 176 and the second circuit film 179 may be combined with another side of the first PCB 128 opposing the first side.

Figure 10A:
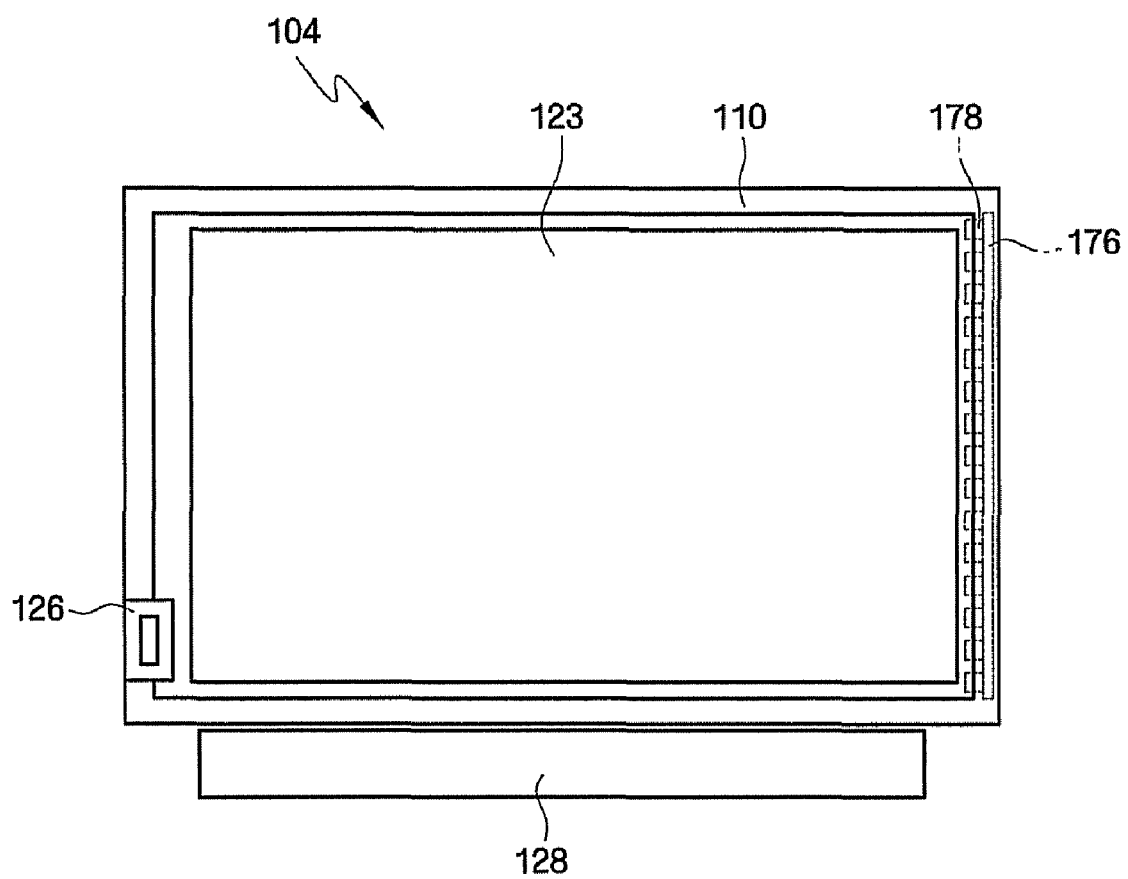
FIG. 10A is a front plan view of an alternative exemplary embodiment of an LCD according to the invention.
Figure 10B:
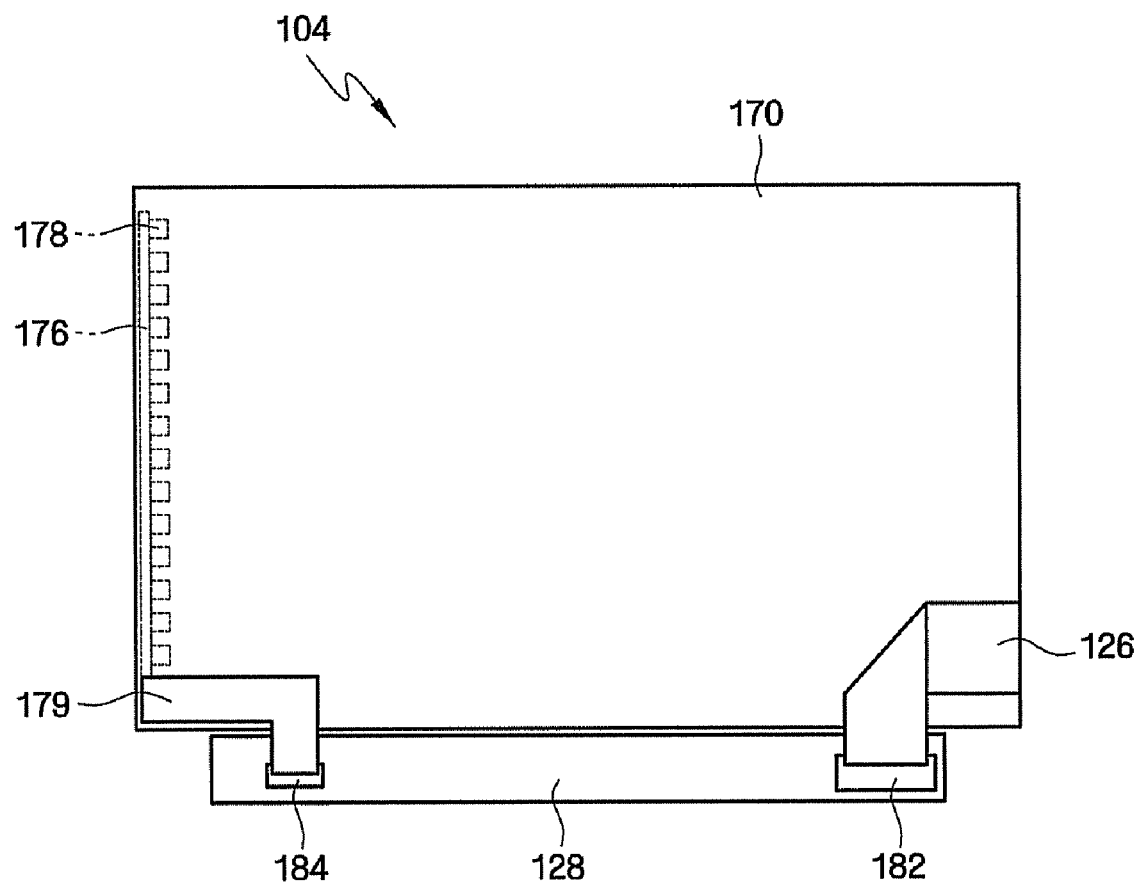
FIG. 10B is a rear plan view of the LCD shown in FIG. 10A.

Hereinafter, an LCD 104 according to an exemplary embodiment of the invention will be described in detail with reference to FIGS. 10A and 10B. FIG. 10A is a front plan view of an alternative exemplary embodiment of an LCD according to the invention, and FIG. 10B is a rear plan view of the LCD shown in FIG. 10A. For convenience of description, components each having the same function for describing the previous embodiments are respectively identified by the same reference numerals, and the following description will be focused on such differences.

In the LCD 104 shown in FIGS. 10A and 10B, a second circuit film 179 and a chip film package 126 are combined with a short side at the lower end (e.g., long side) of a liquid crystal panel 123. Thus, a distance between a connected portion of the second circuit film 179 and the liquid crystal panel 123 and a first PCB 128 is reduced, thereby shortening a length of the second PCB 176 and saving the manufacturing cost.

Figure 11A:
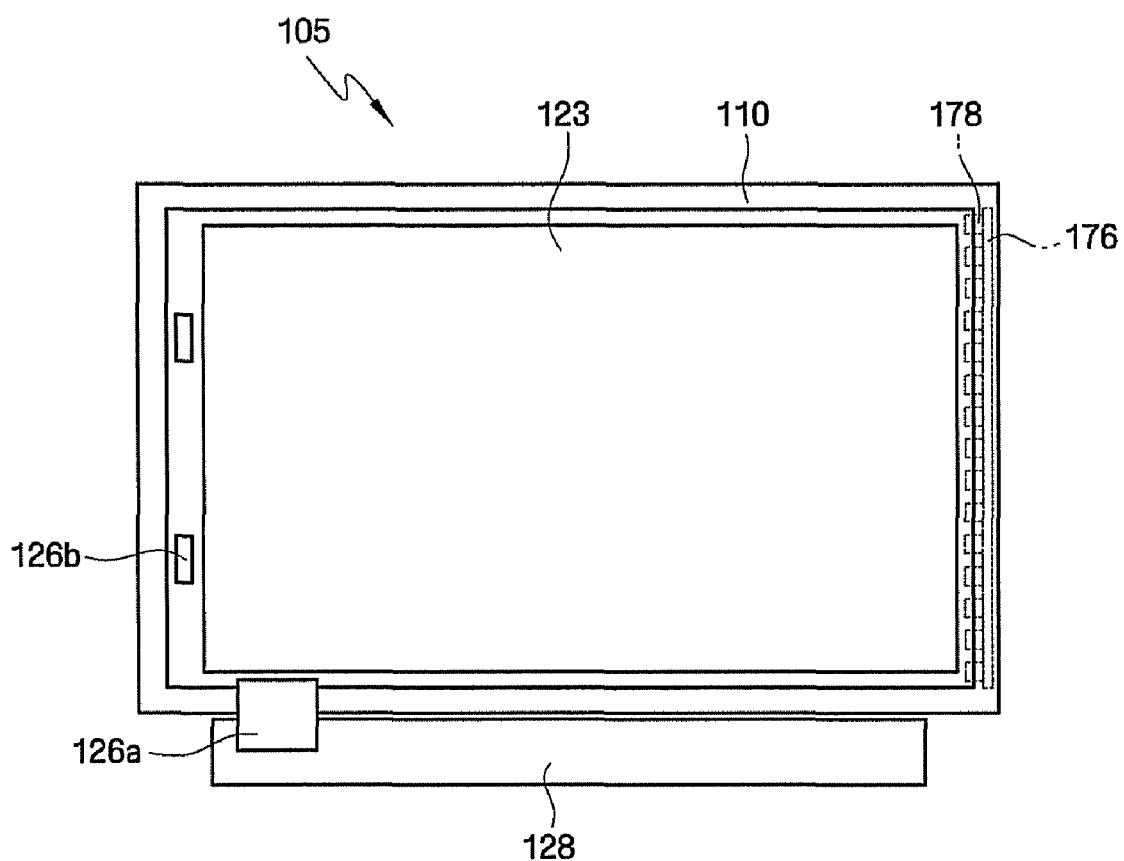
FIG. 11A is a front plan view of an alternative exemplary embodiment of an LCD according to the invention.
Figure 11B:
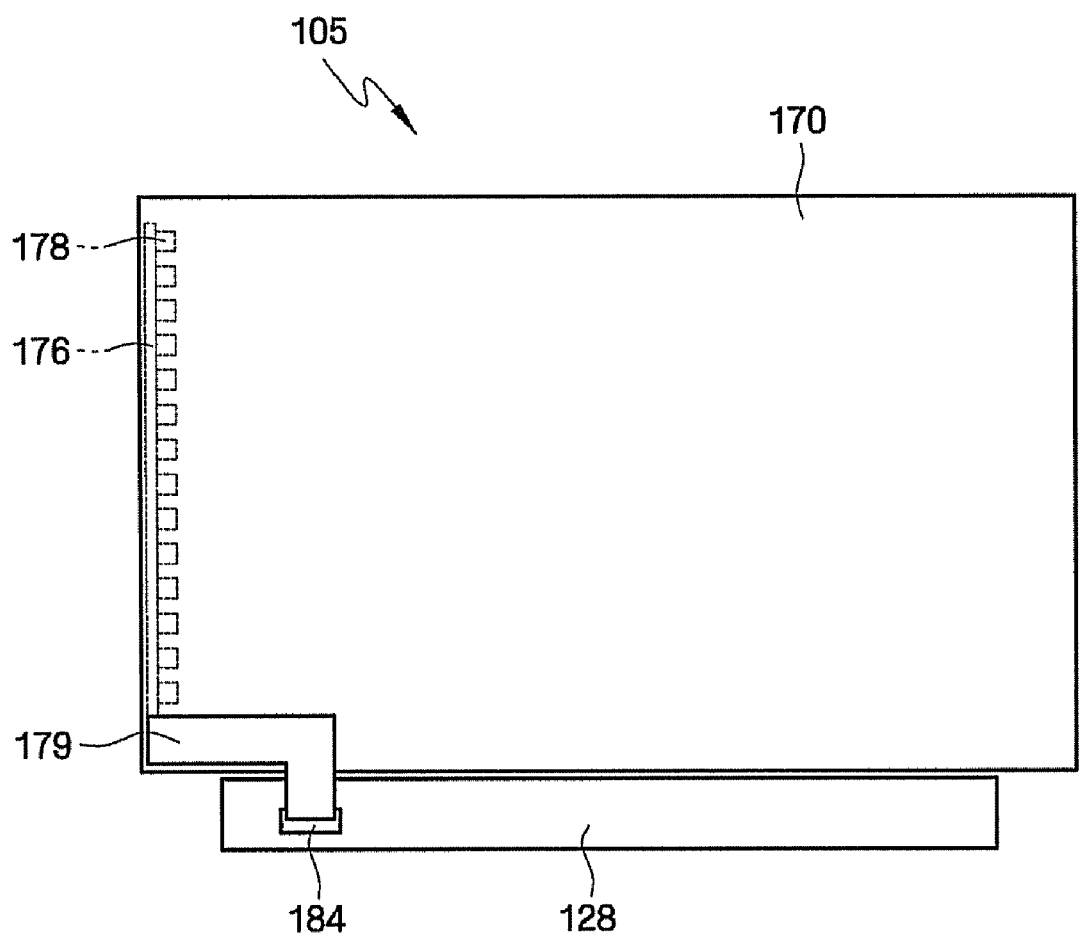
FIG. 11B is a rear plan view of the LCD shown in FIG. 11A.

Hereinafter, an LCD 105 according to an exemplary embodiment of the invention will be described in detail with reference to FIGS. 11A and 11B. FIG. 11A is a front plan view of an alternative exemplary embodiment of an LCD according to the invention, and FIG. 11B is a rear plan view of the LCD shown in FIG. 11A. For convenience of description, components each having the same function for describing the previous embodiments are respectively identified by the same reference numerals, and the following description will be focused on such differences.

In the LCD 105 shown in FIGS. 11A and 11B, a COG chip 126b as a data driver and a first circuit film 126a are used. A first end at the first circuit film 126a is connected to a front lower end of a liquid crystal panel 123 and a second end at the first circuit film 126a is connected to a front surface of a first PCB 128. The first circuit film 126a may be connected to a first PCB 128 using a connector or an anisotropic conductive film. In such a manner, the first circuit film 126a is arranged at a lower end of the liquid crystal panel 123, thereby shortening a length of the circuit film 126a and saving the manufacturing cost. The COG chip 126b and the first circuit film 126a are disposed at adjacent sides of the liquid crystal panel 123, instead of being disposed at a same side in the previously described embodiments. In the illustrated exemplary embodiment, a chip film package such as a TCP or COF may be used as the data driver.

A second circuit film 179 of a light source 177 extends outward through an opening disposed extending through a bottom surface of a lower receiving container 170 to then be connected to a rear surface of the first PCB 128.

Figure 12:
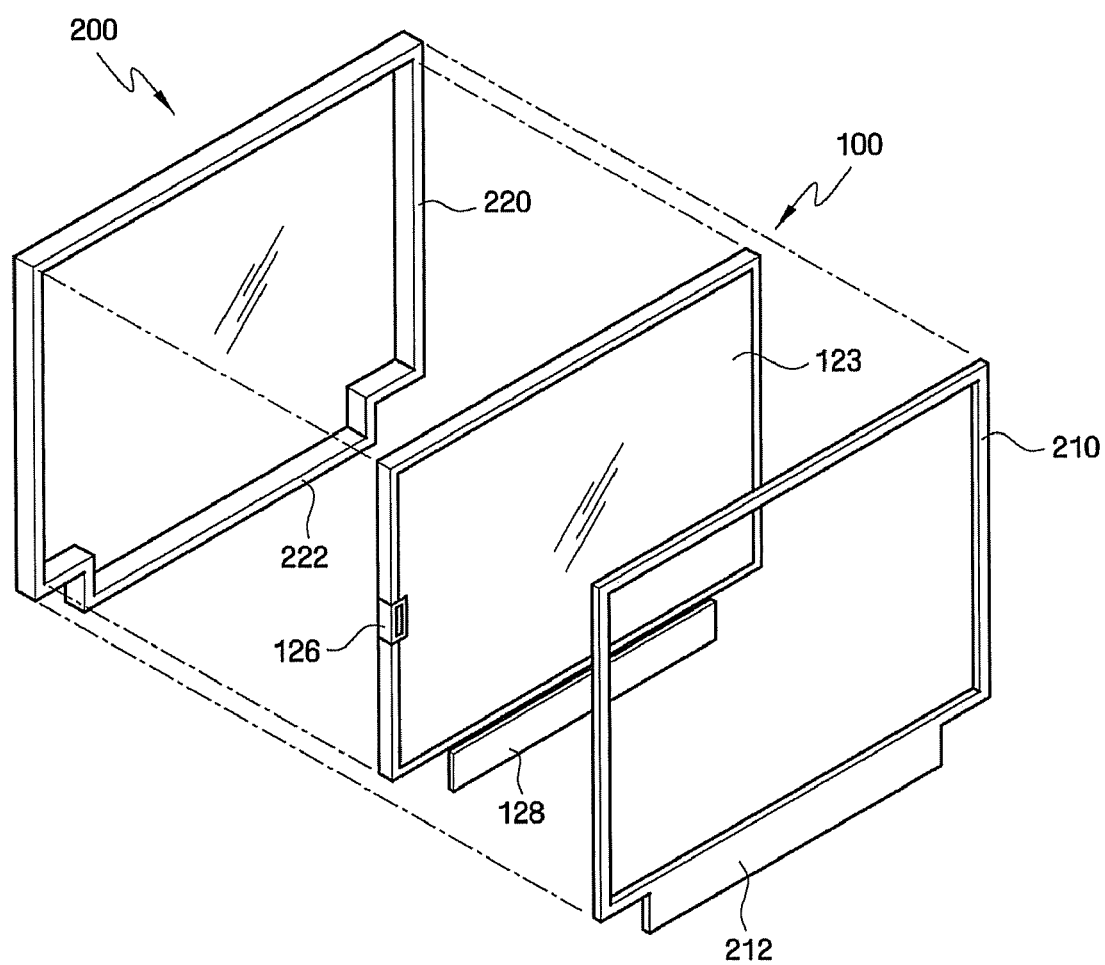
FIG. 12 is an exploded perspective view of an exemplary embodiment of a display apparatus set according to the invention.

Hereinafter, a display apparatus set 200 according to an exemplary embodiment of the invention will be described with reference to FIG. 12. FIG. 12 is an exploded perspective view of an exemplary embodiment of a display apparatus set according to the invention. For convenience of description, the LCD 100 shown in FIG. 1 is employed in the display apparatus set 200 according to the illustrated embodiment by way of example, and all of the above-described LCDs can also be applied to the invention.

Referring to FIG. 12, the display apparatus set 200 includes an LCD (100 of FIG. 1), a back case 220 disposed in the rear of the LCD 100, and a front case 210 disposed in front of the LCD 100 and combined with the back case 220. A window for exposing an effective display area of the LCD 100 is disposed in the front case 210.

In order to minimize a thickness of the display apparatus set 200, a first PCB 128 is disposed on the same plane as a liquid crystal panel 123. Thus, the front case 210 and the back case 220 include substrate receiving portions 212 and 222 for receiving the first printed circuit board 128 at the lower ends thereof, respectively, in the plan view.

In the illustrated exemplary embodiment, the invention has been described with regard to a flat type light guide plate including a single light source disposed at one side by way of example. However, the invention is not limited to the illustrated embodiment, and the light source may be disposed at both sides of the light guide plate. In alternative embodiments, a wedge type light guide plate having a relatively great thickness at an area adjacent to a light source may also be used.

While the invention has been particularly shown and described with reference to exemplary embodiments thereof, it will be understood by those of ordinary skill in the art that various changes in form and details may be made therein without departing from the spirit and scope of the invention as defined by the following claims. It is therefore desired that the exemplary embodiments be considered in all respects as illustrative and not restrictive, reference being made to the appended claims rather than the foregoing description to indicate the scope of the invention.

What is claimed is:

1. A liquid crystal display comprising:
a liquid crystal panel including short sides and long sides;
a gate wire extending substantially parallel with the short sides of the liquid crystal panel;
a data wire extending substantially parallel with the long sides of the liquid crystal panel and insulated from the gate wire with crossing the gate wire;
a first printed circuit board adjacent to a long side of the liquid crystal panel, coplanar with the liquid crystal panel and supplying an image signal to the liquid crystal panel; and
a circuit film electrically connecting the data wire and the first printed circuit board with each other to carry the image signal.

2. The liquid crystal display of claim 1, wherein a first end of the circuit film is connected to the short side of the liquid crystal panel and a second end of the circuit film is connected to the first printed circuit board.

3. The liquid crystal display of claim 2, wherein the circuit film extends along the short side of the liquid crystal panel being disposed behind the liquid crystal panel, and
the first printed circuit board further comprises a connector disposed on a rear side of the first printed circuit board so that the second end of the circuit film is connected to the first printed circuit board through the connector.

4. The liquid crystal display of claim 2, wherein the first end of the circuit film is connected to a central portion of the short side of the liquid crystal panel.

5. The liquid crystal display of claim 2, wherein the first end of the circuit film is connected to a portion of the short side of the liquid crystal panel which is nearer to the first printed circuit board than to a center of the short side.

6. The liquid crystal display of claim 2, wherein the circuit film further comprises a driver IC mounted on the circuit film as a chip-on-film.

7. The liquid crystal display of claim 2, wherein the liquid crystal panel further comprises a driver IC as a chip-on-glass formed on a side end portion of the liquid crystal panel near the short side to which the circuit film is connected.

8. The liquid crystal display of claim 7, wherein the liquid crystal panel further comprises a wire extending from the driver IC to the long side of the liquid crystal panel facing the first printed circuit board, and a first end of the circuit film is connected to the long side to which the wire is extended and a second end of the circuit film is connected to the first printed circuit board.

9. A liquid crystal display comprising:
a liquid crystal panel including short sides and long sides;
a gate wire extending substantially parallel with the short sides of the liquid crystal panel;
a data wire insulated from the gate wire and extending substantially parallel with the long sides of the liquid crystal panel crossing the gate wire;
a first printed circuit board adjacent to a long side of the liquid crystal panel, coplanar with the liquid crystal panel and supplying an image signal to the liquid crystal panel;
a first circuit film electrically connecting the data wire and the first printed circuit board with each other to carry the image signal;
a light guide plate disposed below the liquid crystal panel; and
a light source supplying light to the light guide plate.

10. The liquid crystal display of claim 9, wherein a first end of the first circuit film is connected to the short side of the liquid crystal panel and a second end of the first circuit film is connected to the first printed circuit board.

11. The liquid crystal display of claim 10, wherein a first end portion of the first circuit film extends toward the rear side of the light guide plate and is bent to extend along the short side of the liquid crystal panel being disposed below the light guide plate, and
the first printed circuit board further comprises a connector disposed on a rear side of the first printed circuit board so that the second end of the first circuit film is connected to the first printed circuit board through the connector.

12. The liquid crystal display of claim 10, wherein the first end of the first circuit film is connected to a central portion of the short side of the liquid crystal panel.

13. The liquid crystal display of claim 10, wherein the first end of the first circuit film is connected to a portion of the short side of the liquid crystal panel which is nearer to the first printed circuit board than to a center of the short side.

14. The liquid crystal display of claim 10, wherein the first circuit film further comprises a driver IC mounted on the first circuit film as a chip-on-film.

15. The liquid crystal display of claim 10, wherein the liquid crystal panel further comprises a driver IC as a chip-on-glass formed on a side end portion of the liquid crystal panel near the short side to which the first circuit film is connected.

16. The liquid crystal display of claim 15, wherein the liquid crystal panel further comprises a wire extending from the driver IC to the long side of the liquid crystal panel facing the first printed circuit board, and
a first end of the first circuit film is connected to the long side to which the wire is extended and a second end of the first circuit film is connected to the first printed circuit board.

17. The liquid crystal display of claim 9, wherein the light source comprises,
a second printed circuit board on which point light sources mounted; and
a second circuit film electrically connecting the second printed circuit film to the first printed circuit board,
wherein the second printed circuit board is disposed so that the point light sources are facing one of side surfaces of the light guide plate other than a side surface adjacent to the short side of the liquid crystal panel to which the first circuit film is connected.

18. The liquid crystal display of claim 17, wherein the first circuit film and the second circuit film are disposed apart from each other.

19. The liquid crystal display of claim 9, wherein the liquid crystal display further comprises gate driver IC disposed on a side end portion near a long side of the liquid crystal panel and supplying a gate driving signal to the gate wire.

20. A display apparatus set comprising:
a liquid crystal display;
a front case disposed in front of the liquid crystal display and including an open window exposing a display area of the liquid crystal display;
a back case disposed at a rear of the liquid crystal display and combined with the front case: and
a receiving space defined by the inner surfaces of the front and back cases and disposed near by a long side of the open window,
wherein the liquid crystal display comprises,
a liquid crystal panel including short sides and long sides;
a gate wire extending substantially parallel with the short sides of the liquid crystal panel;
a data wire insulated from the gate wire and extending substantially parallel with the long sides of the liquid crystal panel crossing the gate wire;
a first printed circuit board in the receiving space adjacent to a long side of the liquid crystal panel, coplanar with the liquid crystal panel and supplying an image signal to the liquid crystal panel;
a circuit film electrically connecting the data wire and the first printed circuit board with each other to carry the image signal;
a light guide plate disposed below the liquid crystal panel; and
a light source supplying light to the light guide plate.

* * * * *